Patented Dec. 27, 1932

1,892,280

UNITED STATES PATENT OFFICE

HANS KESSELER, OF MANNHEIM, AND LUDWIG EIFFLAENDER, OF LUDWIGSHAFEN-ON-THE-RHINE, GERMANY, ASSIGNORS TO GENERAL ANILINE WORKS, INC., OF NEW YORK, N. Y., A CORPORATION OF DELAWARE

PRODUCTION OF COLORED COMPOSITIONS

No Drawing. Application filed September 24, 1928, Serial No. 308,131, and in Germany November 8, 1927.

The present invention relates to the improvements in the production of colored compositions.

In the U. S. A. Patent 1,589,700 a process is described for the production of colored cellulose compositions or solutions of the same, which consists in incorporating into compositions of cellulose esters which are plastic, organic or inorganic coloring matters, which are practically insoluble in the solvents used in the preparation or application of the said compositions, the said coloring matters being distributed in such a highly dispersed form that, when dissolved in solvents which are incapable of dissolving the coloring matters, the compositions furnish solutions which only deposit the coloring matter to an insignificant extent, if at all, even on prolonged standing in a diluted condition.

We have now found that colored compositions, which are practically completely soluble in water and the aqueous solutions or suspensions of which are excellently adapted for the dyeing and coloring industry, may be obtained by incorporating, in the manner described in the said patent or by an equivalent mechanical process, coloring materials which are practically insoluble in water into water soluble plastics or such water soluble compositions as are adapted to be rendered plastic. In the resulting masses and their solutions the dyestuffs for example vat dyestuffs or colors for acetate silk or pigment coloring matters are in an extremely highly dispersed state, and are therefore highly suitable for dyeing textiles, coloring leather and for similar purposes. When plastics are employed which do not flocculate out of their aqueous solutions to any substantial amount, or coagulate at the temperatures needed for the production of prints on textile fibres, the new compositions are excellently suitable also for printing and by these means completely even prints are obtained.

The plastic materials employed in this process must, of course, have a sufficiently high internal cohesion to withstand this intensive mechanical treatment since otherwise the desired degree of dispersion of the dyestuff in the plastic could not be attained. In other words, if the internal cohesion of the plastic is not sufficiently high, the plastic will be disrupted into shreds and fine particles by the treatment whereby its capability for developing the finely divided dyestuff to form a homogeneous mass will be destroyed.

Suitable plastic compositions for use according to the present invention are water-soluble artificial resins, for example, the alkali salts of the alkali soluble artificial resins obtainable by the interaction of aldehydes with aromatic carboxylic acid or sulfonic acids or derivatives thereof, such as carboxylic acids of phenols or ethers of the same, or with mixtures of phenols and aromatic carboxylic acids, or by treating phenol-aldehyde condensation products with halogenated fatty acids or with phenol sulfonic acids, such as a naphthol sulfonic acid, or with an aromatic or aliphatic compound containing one or more easily exchangeable sulfonic groups, such as a hydroxy-alkyl sulfo hydroxy phenol sulfonic acid, or the sulfur bearing compounds obtainable by the condensation of phenols or substitution products thereof, such as halogenated phenols or phenol carboxylic acids with alkali metal sulfides or polysulfides, with which plastic printing compositions are also obtained, or water soluble caseins, prepared, for example, with alkali from casein and like materials which latter are most suitable for coloring compositions for other purposes than printing. Also products which can be obtained by treating resinous substances, such as colophony or cumaron, with halogenated aralkyl sulfonic acids and the like, such as benzylchlorid sulfonic acid, or ketones, such as cyclohexanone, with alkali can be employed for the purpose of the present invention as well as sulfite cellulose waste liquor which has been evaporated so far as to form a tenacious substance.

The process of incorporating the coloring materials with the aforesaid materials is advantageously carried out by rolling mixtures of the initial materials in a friction roller mill or by using a high-effect malaxator or kneading machine and/or an extrusion press. It has been found that the best results are obtained with the aforesaid machinery which effects a thorough kneading and, simultaneously, stretching action. The mechanical operation is continued until a solution of a test portion in water does not allow the coloring matter to settle to any substantial amount even in a dilute condition and in a long period of time. When this state has been reached the mass contains the coloring material in a practically colloidal state and, in a thin layer, it is transparent. In order to facilitate the said mechanical operation small amounts of diluents may be added, such as water, if desired, also organic diluents, which are miscible with water at least in the amounts thereof employed in the use of the colored compositions, but do not dissolve the coloring matter to a substantial degree. Such diluents are for example, polyhydric alcohols or mono-alkyl ethers of the same, aliphatic hydroxy alkyl amines, dioxane and so on. If desired, also small amounts of wetting agents, such as Turkey-red oil and the like, or other synthetic wetting agents, thickening agents, such as British gum, sugars and natural water-soluble gums or several of the aforesaid agents can be incorporated. The colored masses obtained are used as such or after drying them whereupon they can be comminuted in any known manner.

The following examples will further illustrate the nature of the said invention which however is not limited thereto. The parts are by weight.

*Example 1*

60 parts of crystallized 1.4-diamino anthraquinone are mixed with 40 parts of the sodium salt of the condensation product obtained by treating a condensation product of 3 parts of phenol with 1 part of acetic aldehyde with chloro acetic acid and adding caustic soda solution, while stirring and heating to about 80° C., and worked in a roller mill, with the addition of 30 parts of water, until the desired degree of fineness of the coloring matter has been obtained. The resulting film is dried in the air and ground and furnishes a violet powder which gives, with water, a violet, inky liquid. When made into printing color in the usual manner, it gives even impressions of uniform color strength, for example, on acetate silk, the effect being the same as is obtained with the equal quantity of dyestuff in form of the usual paste. The said powder is also very suitable for dyeing acetate silk. Instead of the aforesaid condensation product, similar products obtainable by the condensation of a phenol sulfonic acid with formaldehyde or another, obtainable by condensing a phenol with sulfur in the presence of alkali or by treating a phenol-formaldehyde condensation product with a phenol sulfonic acid or with one of the aforesaid compounds containing easily exchangeable sulfonic groups may be employed.

*Example 2*

60 parts of any convenient vat dyestuff powder, such as indanthrene blue (Colour Index No. 1106), in a state of coarse dispersion, are treated in the manner specified in Example 1. A powder is obtained which dissolves to an almost completely colloidal solution in water and, when used for dyeing and printing by the methods customary with vat dyestuffs, gives yields at least as good as the corresponding quantity of dyestuff paste.

*Example 3*

50 parts of water soluble casein (alkali caseate) are mixed with 25 parts of water and 15 parts of pulverized lithol red (Colour Index No. 166) and kneaded and worked in a roller mill to a thin layer. An aqueous solution of this mass, preferably after admixture of plasticizers and preservatives, is very suitable for varnishing leather, the colloidal dispersion of the dyestuff producing a certain transparency of the film which is a highly esteemed property for the said purpose.

*Example 4*

40 parts of 1-amino-4-hydroxy-anthraquinone in mixture with 60 parts of water soluble casein and 3 parts of a disinfectant, such as para-chloro-metacresol, are kneaded with 25 parts of water and rolled in a friction mill until a uniform thin film is formed which is dried in the air and then ground to powder. On dissolving this product in water a practically non-settling solution is obtained which is most suitable for dyeing artificial silk, especially acetate silk.

What we claim is:

1. A colored composition comprising an organic, water-soluble, artificial resin, which in plastic condition possesses sufficient internal cohesion to withstand an intensive mechanical mixing and kneading treatment without disruption, and a water-insoluble dyestuff incorporated in said resin in such a highly dispersed state that it does not settle out from dilute solutions of the composition in water.

2. A colored composition comprising an organic, water-soluble, artificial resin, which in plastic condition possesses sufficient internal cohesion to withstand an intensive mechanical mixing and kneading treatment without disruption, a diluent, and a water-insoluble dyestuff incorporated in said resin in such a highly dispersed state that it does not settle out from dilute solutions of the composition in water.

3. A colored composition comprising an organic water-soluble, artificial resin, which in plastic condition possesses sufficient internal cohesion to withstand an intensive mechanical mixing and kneading treatment without disruption and which is not deflocculated from water solutions thereof by heating, and a water-insoluble dyestuff incorporated in said resin in such a highly dispersed state that its does not settle out from dilute solutions of the composition in water.

4. A colored composition comprising the sodium salt of the condensation product obtained by treating a condensation product of three parts of phenol and one part of acetaldehyde with chlor-acetic acid and a water-insoluble dyestuff incorporated in said sodium salt in such a highly dispersed state that it does not settle out from dilute solutions of the composition in water.

5. A colored composition comprising a sodium salt of the condensation product of phenol sulfonic acid and an aldehyde and a water-insoluble dyestuff incorporated in said sodium salt in such a highly dispersed state that it does not settle out from dilute solutions of the composition in water.

6. A colored composition comprising the water-soluble sodium salt of a resinous phenol-aldehyde condensation product condensed with a phenol sulfonic acid, and a water-insoluble dyestuff incorporated in said sodium salt in such a highly dispersed state that it does not settle out from dilute solutions of the composition in water.

In testimony whereof we have hereunto set our hands.

HANS KESSELER.
LUDWIG EIFFLAENDER.